United States Patent [19]
Blair

[11] Patent Number: 5,369,764
[45] Date of Patent: Nov. 29, 1994

[54] METHOD FOR SHARING ACCESS TO DATABASE ELEMENTS IN A DATA PROCESSING SYSTEM

[76] Inventor: Gary L. Blair, 2241 Sagamore Rd., Charlotte, N.C. 28209

[21] Appl. No.: 139,615

[22] Filed: Oct. 18, 1993

Related U.S. Application Data

[63] Continuation of Ser. No. 4,626, Jan. 14, 1993, abandoned, which is a continuation of Ser. No. 514,095, Apr. 25, 1990, abandoned.

[51] Int. Cl.$^5$ .................. G06F 9/312; G06F 12/00
[52] U.S. Cl. ..................... 395/650; 395/600; 364/DIG. 1; 364/256.8; 364/281.3; 364/281.4; 364/281.7; 364/281.8; 364/282.1
[58] Field of Search ............ 395/600, 650, 700

[56] References Cited

U.S. PATENT DOCUMENTS

| | | | |
|---|---|---|---|
| 4,231,106 | 10/1980 | Heap et al. | 364/900 |
| 4,393,446 | 7/1983 | Gurr et al. | 364/200 |
| 4,399,504 | 8/1983 | Obermarck et al. | 364/200 |
| 4,480,304 | 10/1984 | Carr et al. | 364/200 |
| 4,601,008 | 7/1986 | Kato | 364/900 |
| 4,627,019 | 12/1986 | Ng | 364/900 |
| 4,665,484 | 5/1987 | Nanba | 364/200 |
| 4,698,752 | 10/1987 | Goldstein et al. | 364/200 |
| 4,965,719 | 10/1990 | Shoens et al. | 364/200 |
| 4,993,030 | 2/1991 | Krakaver et al. | 371/40.1 |
| 5,129,086 | 7/1992 | Coyle, Jr. et al. | 395/650 |
| 5,161,227 | 11/1992 | Dias et al. | 395/650 |

OTHER PUBLICATIONS

Hwang and Briggs, *Computer Architecture and Parallel Processing,* 1984, pp. 29-31; 732-768.

Primary Examiner—Thomas G. Black
Assistant Examiner—Peter Y. Wang
Attorney, Agent, or Firm—Bell, Seltzer, Park & Gibson

[57] ABSTRACT

This invention relates to data processing methods and systems. More particularly, this invention relates to database generation, management, and handling programs and systems which are capable of multitask processing. The present invention provides four facilities for enhancing operation of such programs, namely a resource serialization or enque facility; an auto commit facility; a performance monitoring facility; and a checkpoint insertion facility.

8 Claims, 4 Drawing Sheets

METHOD FOR SHARING ACCESS TO DATABASE ELEMENTS IN A DATA PROCESSING SYSTEM

This is a continuation of co-pending application Ser. No. 08/004,626 filed on Jan. 14, 1993, abandoned which is a continuation of application Ser. No. 07/514,095, filed Apr. 25, 1990 (now abandoned).

FIELD AND BACKGROUND OF DISCLOSURE

This invention relates to data processing methods and systems. More particularly, this invention relates to database generation, management, and handling programs and systems which are capable of multitask processing.

As used in this disclosure, the term data base management refers to computer programs and systems which are capable of receiving items of data which relate to defined fields; storing those items in data files structured in accordance with systematic rules or procedures; permitting access to the files for correction, updating and the like; and permitting access to the files for the generation of reports. The term multitask processing or multitasking refers to the capability of a computer system to handle or permit more than one operator and/or more than one particular program to interact with the system and the data files stored in the system at any one time.

Database management systems and computer programs or software are well known, and are available for use on data processing systems ranging in size from the very large to desktop personal computers. While the difficulties and problems encountered in using such systems and programs will vary with the specific program and the machine environment in which the programs are run, there are at least certain problems which are commonly encountered. For purposes of understanding the present invention, certain of those problems and the manner in which they are avoided or overcome by this invention will be pointed out hereinafter with particular reference to one environment. However, it is to be understood at the outset that this invention contemplates that the improvements here described may be effective in other environments.

At the time of the writing of this disclosure, computer users who face the necessity of processing large volumes of data conventionally use machines known as "mainframes", which are relatively large and powerful machines capable of multitasking and typically having a number of terminals from which access to the central processor and the the data files stored under the control of the central processor may be obtained. Typically, such an environment will use a data management system or facility through which a user can define the form of data files and under which specific programs which manipulate the data stored in the files for specific purposes may operate. For mainframes provided by International Business Machines Corporation ("IBM"), a data management facility or database management program which is in wide use is that known as DB2. Where DB2 is in use, application programs are executed using a System Query Language or SQL. Such applications programs may, for example, deal with such issues as entering invoice information; updating price or inventory information; preparing reports of sales by customer or salesperson identification; billing; and a number of other definable functions. In a typical large data processing center using equipment and programs as here described, application programs to achieve particular purposes may be acquired or written to achieve the particular results intended.

In the environment described, a Time Sharing Option or TSO is often used to enable batch programs which access datafiles of a system to be run. Executing programs under TSO, as distinguished from executing them "natively" or simply within the hierarchy established by the environment, gives rise to difficulties in that such programs incur memory allocations which natively executed programs do not. Further, should the program end abnormally ("abend") for any reason, files may be left improperly disposed and the abend may not be readily recognizable. Should an attempt be made to record execution statistics for evaluating the program operation, then such data are recorded under TSO in a way which does not give assurance that the data are properly linked to the program which has operated. Finally, if operated in an environment where the operating system for the data processing system provides for the possibility of a checkpoint/restart facility, executing a program under TSO will block access to that facility.

BRIEF DESCRIPTION OF DISCLOSURE

With the foregoing in mind, it is an object of this invention to provide a method of processing data in an environment of the type described in which the difficulties encountered heretofore are lessened or eliminated. In realizing this object of this invention, methods of data processing are utilized in which access to data files is controlled in such manners as to assure that any programs to be executed can be executed and that the integrity of data files is maintained to the greatest degree possible.

Yet a further object of this invention is to provide data processing systems in which data file access and storage in a database management facility is selectively controlled in order to facilitate appropriate execution of programs. In realizing this object of the present invention, modules are provided for performing defined flagging and committing functions.

Another object of this invention is to facilitate evaluations of the relative efficiency of different programs. In realizing this object of this invention, provision is made for recording the computational time required for recorded programming requests.

Yet another object of this invention is to enable the insertion, into a stream of data entering a data processing system, of indicia which facilitate restarting the execution of a program which may have been abnormally interrupted. In realizing this object of the present invention, an operating system for the data processing system is instructed to insert into a data stream a checkpoint at predetermined intervals.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

Figure 1:
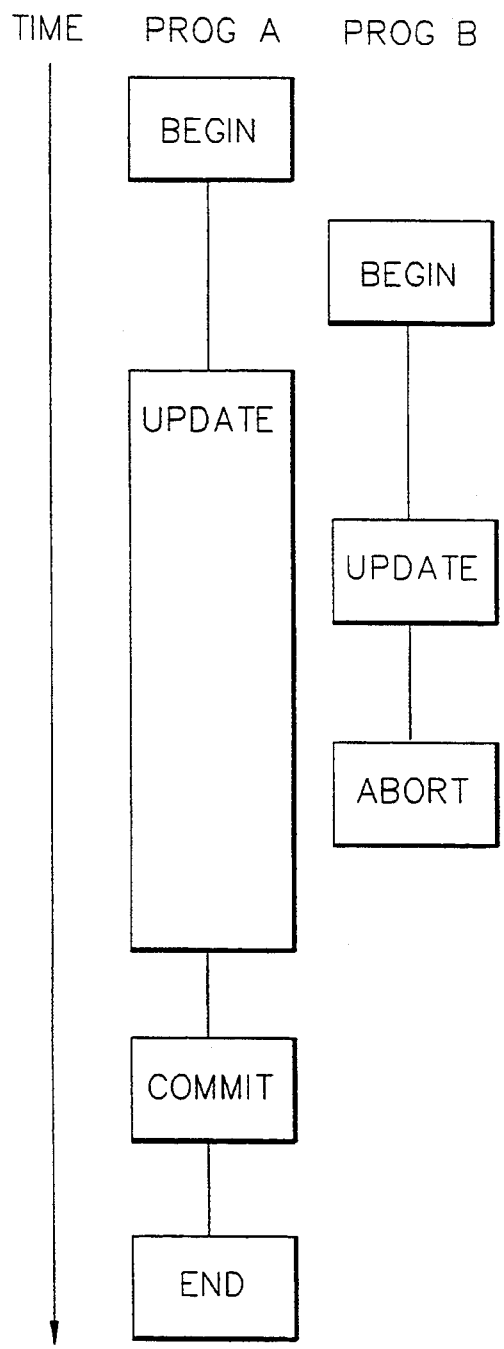
FIG. 1 is a flow chart illustrating the operation of a data processing system in accordance with a prior method which creates certain difficulties.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Because the nature of this invention is such that it is embodied in data processing systems and methods, the accompanying drawings represent the invention through flow charts, and it is assumed that the interested reader is familiar with such charts and the manner in which they indicate the processing steps and the modules of a data processing operation and system. Because there are several aspects to the present invention, the description which follows, and the related flow charts, will address them in a certain order. However, the knowledgeable reader will understand that any one or more of the aspects may be realized together, and that they may be nested within one another or elected to be unused, depending upon specific circumstances. Thus while the aspects will be discussed in a certain order, that order need not necessarily apply to the use of the various features or facilities.

It is to be understood at the outset that this invention is used, as a method, in the context of a multitask capable computer system having a central processor unit for reading and manipulating data; storage memory for retaining data files; working memory for retaining data files to be read and manipulated by the processor unit; an operating system for directing the transfer of data among the processor unit, storage and working memory; at least one data base management program for dictating the organization of data into a plurality of data base files retained in the storage and working memory and for opening and closing data base files as required for transfer, reading and manipulation of data; and a data entry peripheral device for entering data into the data base files. Viewed as a system per se, the system is a multitask capable data processing system comprising a central processor unit for reading and manipulating data; storage memory for retaining data files; working memory for retaining data files to be read and manipulated by the processor unit; an operating system for directing the transfer of data among the processor unit, storage and working memory; at least one data base management program module for dictating the organization of data into a plurality of data base files retained in the storage and working memory and for opening and closing data base files as required for transfer, reading and manipulation of data; a data entry peripheral for entering data into the data base files; and one or more modules for performing special functions as described more fully hereinafter.

Figure 2:
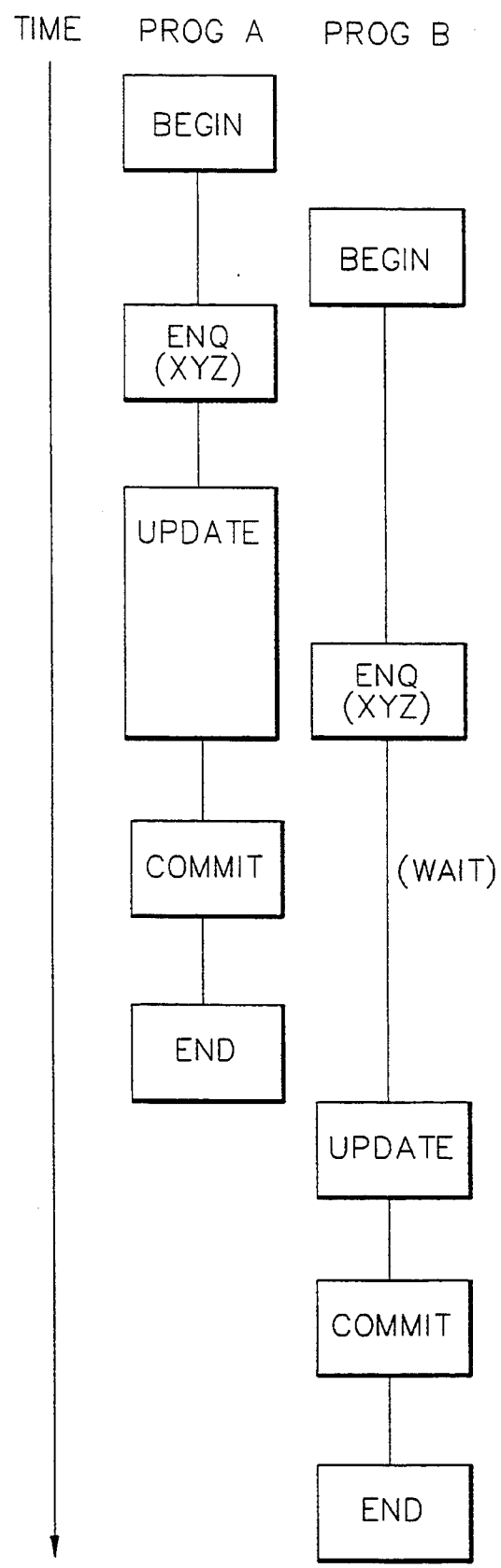
FIG. 2 is a flow chart similar to that of FIG. 1, illustrating the operation of a data processing system in accordance with one aspect of the present invention which avoids the difficulties of the method of FIG. 1.

Turning first to FIGS. 1 and 2, the aspect of this invention there addressed may be identified as a resource serialization or enque serialization feature. FIG. 1 illustrates a common sequence of events over time in the operation of a multitasking data processing system in which a Program A (the left column in FIG. 1) and a Program B (the right column in FIG. 1) both begin execution and attempt to update records in a defined data base. Program A will normally proceed from its beginning, through execution of updates to a commitment of the updated records to the data base in final form and a normal end. Program B, beginning after Program A, will find that Program A has locked each block or page of records updated until such time as the changes made are committed. Program B will eventually seek to update a block or page which Program A has locked and, on that occurrence, will wait until a predetermined wait limit has been exceeded and then abort. Program B must then be restarted at some later time, after the necessary records become available free of locks.

In accordance with a first aspect of this invention as illustrated in FIG. 2, programs include a data module enabling the selective setting of an operatin system flag retained with individual data base files to one of the two states of shared access and exclusive access to the individual data base file. As a program, such as Program a in FIG. 2, is loaded for execution, resource serialization control parameters, or enque parameters, are processed. These control parameters identify the particular records, or blocks or pages of records, with which Program A will be working, and may set those records to either permit or deny access by other programs being executed contemporaneously. The programs may then respond to a data base file having a flag set to the state for shared access by permitting simultaneous access to the data thereof by more than one program directing particular manipulations of the data in the data base file, or respond to a data base file having a flag set to the state for exclusive access by prohibiting simultaneous access to the data thereof by more than one program directing particular manipulations of the data in the data base file.

FIG. 2 illustrates a sequence in which the enque parameters for Program A mark an area of data files for exclusive access. Program B, beginning execution later, is identified by its enque parameters are requiring access to the area of data files then marked for exclusive access by Program A. Having been so identified, Program B is put into a wait state until Program A has terminated through a commit and the data files have been released, enabling Program B to acquire access to the area and proceed. Thus an abnormal end for Program B is avoided.

Figures 3, 4:
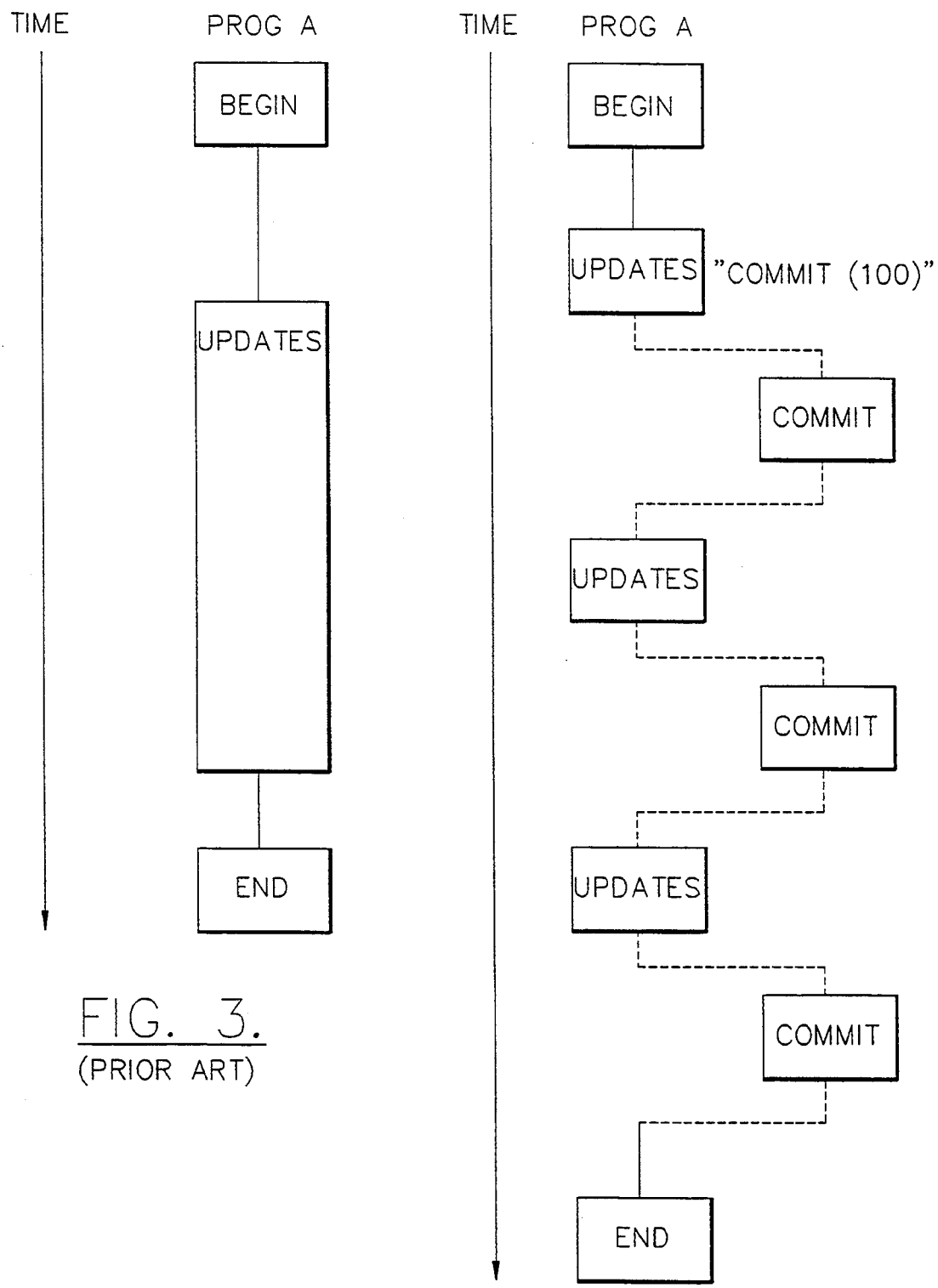
FIG. 3 is a flow chart illustrating the operation of a data processing system in accordance with a prior method which creates certain difficulties.
FIG. 4 is a flow chart similar to that of FIG. 3, illustrating the operation of a data processing system in accordance with a second aspect of the present invention which avoids the difficulties of the method of FIG. 3.

As illustrated in FIG. 3, the normal process of execution of a program is for the program to begin, updating to proceed, and the program to end. While the program is executing, updates are held in storage and locked to prevent access to other users, as described above. At the normal ending of a program, updated files are committed implicitly to the data base by the data base management facility. This "normal" operation, as described above and hereinafter, can lead to a number of difficulties.

As contemplated by the aspect of this invention to which FIG. 4 is directed, a program when loading for execution may be provided with instructions for committing updated data files at periodic intervals. More particularly, modules are provided for monitoring the transfer of data into the working memory and the manipulation thereof in accordance with a program (here, Program A) directing particular manipulations of the data in the data base file, then responding to the transfer of data into the working memory and the manipulation thereof by setting an interval to be measured, and responding to expiration of the measured interval by automatically transferring data from the working memory to the storage memory. In the flow chart of FIG. 4, and for purposes of illustration only, the parameters used call for updated data files to be committed to the data base files after each one hundred updates. As each one hundred updates are reached, the corresponding block of records are released on being committed.

As will be appreciated from a consideration of the process of FIG. 2 in view of the process of FIG. 4, it is possible that the overlap which has resulted in Program B being held in wait state is less than complete with the files necessary for Program A to execute. Where both the method steps of FIGS. 2 and 4 are used together, then the periodic commit may enable Program B to begin executing at an earlier time than would otherwise be the case.

Figure 5:
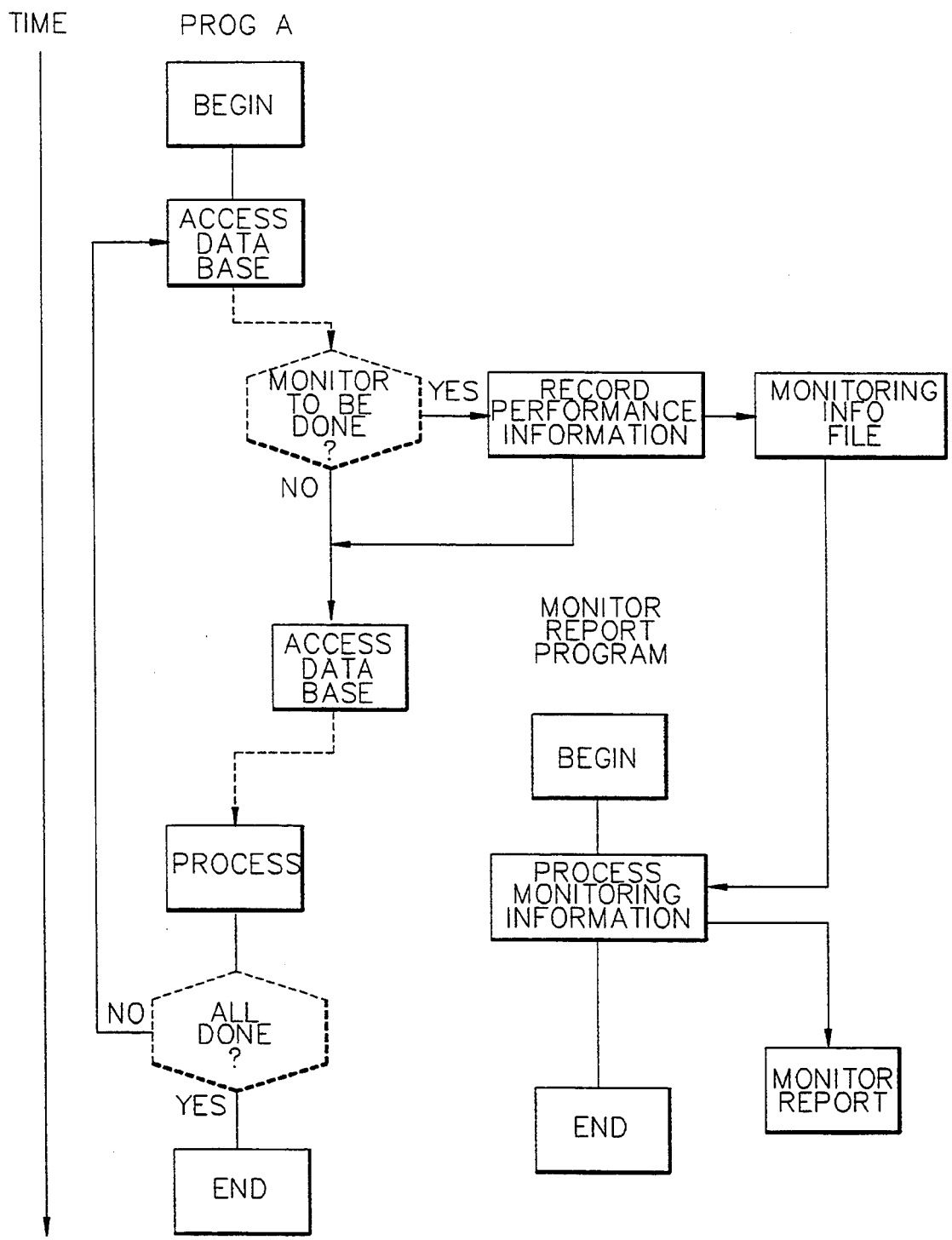
FIG. 5 is a flow chart illustrating the operation of a data processing system in accordance with a third aspect of the present invention.
Figure 6:
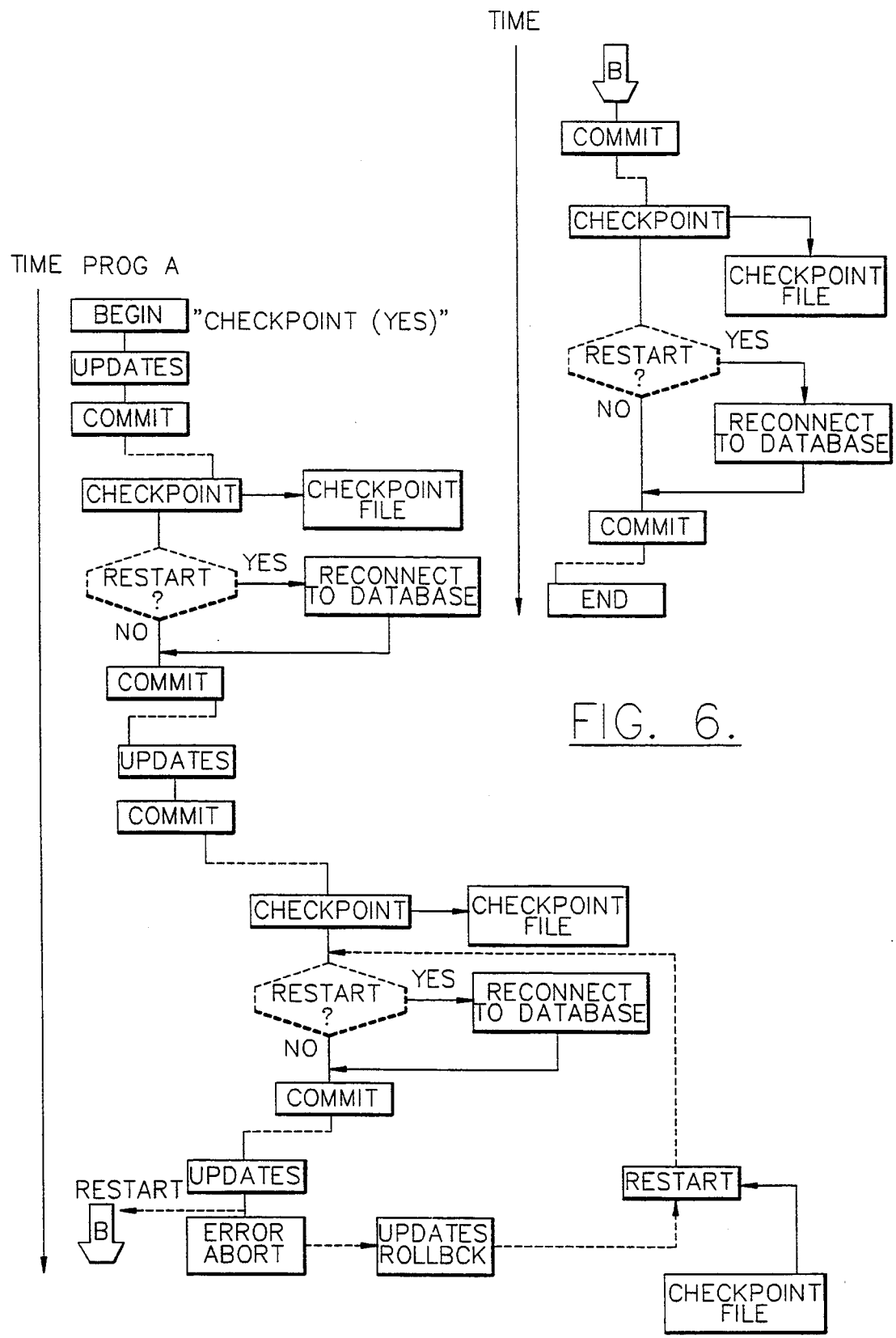
FIG. 6 is a flow chart illustrating the operation of a data processing system in accordance with with a fourth aspect of the present invention.

Referring now more particularly to FIG. 5, the present invention contemplates that provision be made for evaluating the performance of programs loaded and executed in the data processing system described. Such evaluation may begin with addition to a program such as Program A of parameters indicating the performance monitoring is to be done. Then, by modules as contemplated by this invention, the transfer of data into the working memory and the manipulation thereof in accordance with a program directing particular manipulations of the data in the data base file (such as Program A) is monitored, the form of program instructions entered in initiating manipulation of data recorded, the computation time required for central processor manipulation of data in accordance with recorded program instructions recorded, and the recorded instructions and computation time registered as indicators of the relative efficiency of the form of program instructions entered. Such registered instructions and time required for execution may be embodied into reports from which a user may select which of various forms of program are most efficient at accomplishing intended objectives.

The final aspect of this invention which has briefly been identified above is the provision of a means for enabling restarting of a program which may have aborted due to error with minimal adverse effects on the overall system. This invention contemplates that parameters may appear at the beginning of a program, such as Program A, which cause the program to send a checkpoint command to a control program every time that the program sends a commit command to the data base system. As a consequence, upon Program A issuing a commit command after updating of data files, the issuance of the checkpoint command causes the control program to save a "snapshot" of program and working storage areas, registers and file position pointers to a checkpoint file. The checkpoint command returns a code indicating whether a restart is occurring. If the decision is "yes" then the program re-establishes a connection to the data base files and facility and processing resumes If the decision is "no", then processing simply proceeds, with a continuation of updating, commit, and checkpoint. If at any point Program A aborts on an error, then all updates since the last checkpoint and prior to the error are rolled back or rendered ineffectual by the data base facility, the checkpoint restores the storage areas, registers and pointers, reconnection is established, and processing continues to a normal ending for the program.

As will be appreciated, the process just described includes monitoring the transfer of data into the working memory and the manipulation thereof in accordance with a program directing particular manipulations of the data in the data base file (here, Program A), responding to the entry of data into the data base files by setting an interval to be measured, and responding to expiration of the measured interval by automatically inserting into the data entered a checkpoint and thereupon transferring data from the working memory to the storage memory.

In the drawings and specifications there has been set forth a preferred embodiment of the invention and, although specific terms are used, the description thus given uses terminology in a generic and descriptive sense only and not for purposes of limitation.

What is claimed is:

1. A method of sharing access to a plurality of database elements in a database executing on a data processing system, said method comprising the following steps performed by said data processing system:

accepting a first request to perform a first task, said first task comprising a plurality of steps including a step of accessing a first set of selected database elements in said database;

in response to the first task request, performing the first task comprising a plurality of steps including a step of accessing said first set of selected database elements;

accepting a second request to perform a second task, said second task comprising a plurality of steps including a step of accessing a second set of selected database elements, said second set of selected database elements and said first set of selected database elements having at least one selected database element in common, while the first task is being performed;

in response to the second task request, preventing performance of said second task, prior to beginning performance of said second task, thereby preventing access to said second set of selected database elements prior to performing said second task, including the step of accessing said second set of selected database elements, until said first task is completed; and upon completion of said first task, performing the second task, comprising a plurality of steps including the step of accessing said second set of selected database elements.

2. The method of claim 1 wherein said first task request accepting step comprises the step of generating first enque parameters for said first set of selected database elements, said first enque parameters identifying said first set of selected database elements, and wherein said second task request accepting step comprises the step of generating second enque parameters for said second set of selected database elements, said second enque parameters identifying said second set of selected database elements.

3. The method of claim 2 wherein said preventing performance step is preceded by the step of comparing said first enque parameters and said second enque parameters prior to performing said second task, including the step of accessing said second set of selected database elements.

4. The method of claim 1 wherein said preventing performance step comprises the step of placing said second task in a wait state prior to performing said second task, including the step of accessing said second set of selected database elements.

5. The method of claim 1 wherein said second task request accepting step is preceded by the step of selectively prohibiting shared access to said first selected database elements; and wherein said preventing performance step comprises the step of delaying performance of said second task until completion of said first task, if shared access to said first selected database elements is prohibited.

6. The method of claim 5 wherein said selectively prohibiting step comprises the steps of:
   providing flags for said first selected database elements for indicating that shared access is prohibited; and
   setting a flag associated with said first selected database elements to indicate that access to said first selected database elements is prohibited.

7. The method of claim 1 wherein said preventing performance step comprises the step of delaying performance of said second task prior to performing said second task, including the step of accessing said second set of selected database elements, until a commit request for said first set of selected database elements is issued during performance of said first task.

8. A method of sharing access to a plurality of database elements in a database executing on a data processing system, said method comprising the following steps performed by said data processing system:
   selectively prohibiting shared access to selected database elements by providing flags for said database elements for indicating that shared access is prohibited, and by setting a flag associated with said selected database elements to indicate that access to said selected database elements is prohibited;
   accepting a first request to perform a first task, said first task comprising a plurality of steps including the step of accessing a first set of selected database elements in said database, wherein said first task request accepting step comprises generating first enque parameters for said first set of selected database elements, said first enque parameters identifying said first set of selected database elements;
   in response to the first task request, performing the first task comprising a plurality of steps including the step of accessing said first set of selected database elements;
   accepting a second request to perform a second task comprising a plurality of steps including a step of accessing a second set of selected database elements, said second set of selected database elements and said first set of selected database elements having at least one selected database element in common, while the first task is being performed, wherein said second task request accepting step comprises generating second enque parameters for said second set of selected database elements, said second enque parameters identifying said second set of selected database elements;
   comparing said first enque parameters and said second enque parameters prior to performing said second task, including the step of accessing said second set of selected database elements;
   in response to the comparison of said first enque parameters and said second enque parameters, placing said second task request in a wait state prior to performing said second task, including the step of accessing said second set of selected database elements, until said first task is completed; and
   upon completion of said first task, performing the second task, comprising a plurality of steps including the step of accessing said second set of selected database elements.

* * * * *